United States Patent Office 3,490,505
Patented Jan. 20, 1970

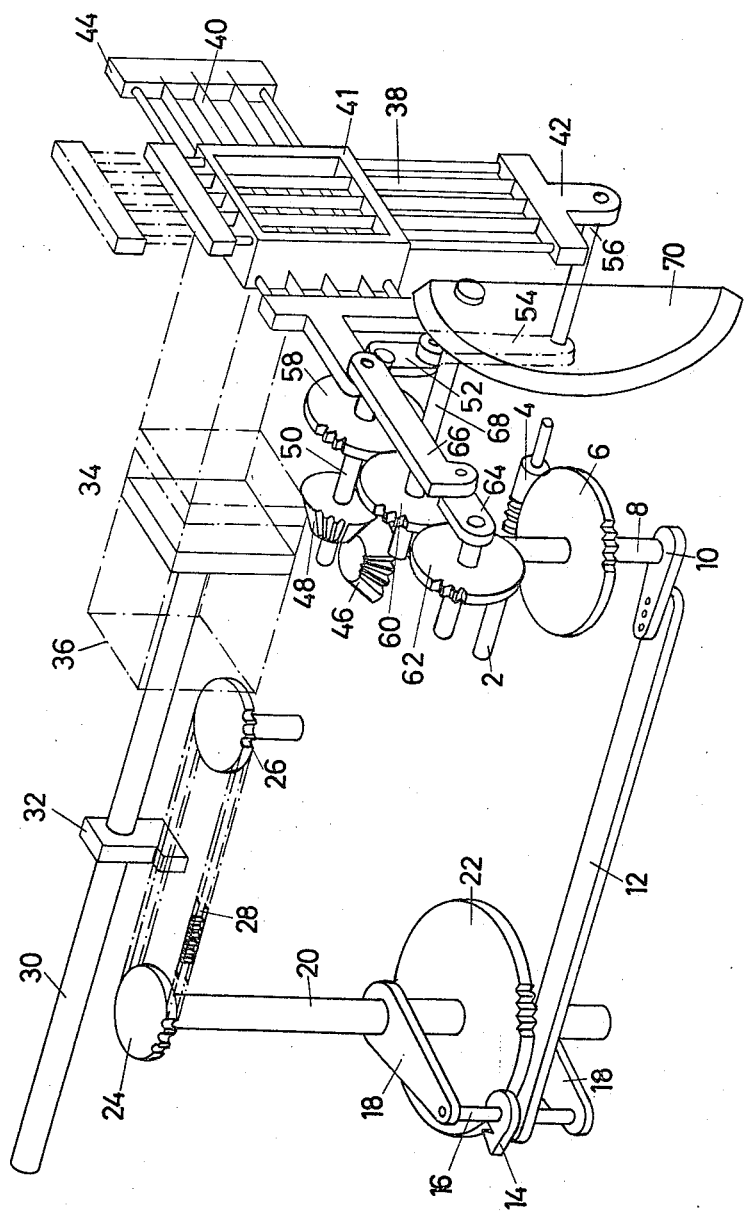

3,490,505
CUTTING DEVICE
Ernst Holz, Hauptstrasse 76, Heidenheim-
Schnaitheim, Germany
Filed May 9, 1967, Ser. No. 638,191
Int. Cl. B26d 4/40
U.S. Cl. 146—78                    7 Claims

ABSTRACT OF THE DISCLOSURE

A cutting device comprising advancing means for advancing material to be cut in a predetermined path. At least one cutting element is arranged downstream of the advancing means and is mounted for displacement transversely of the path. Drive means is operatively connected with the advancing means for effecting intermittent operation thereof to thereby advance the material to be cut through a predetermined distance in the path, and further for concomitantly effecting displacement of the cutting element through a distance which is greater than the predetermined distance.

Cross-references to related applications

An apparatus which can utilize the device herein disclosed is disclosed in my copending application, Ser. No. 625,560, filed on Mar. 20, 1967 and entitled "Cutting Apparatus."

Background of the invention

The present invention relates to cutting apparatus in general, and more particularly to a cutting device which is particularly suited for cutting bacon and other foodstuffs.

In the cutting, and particularly the dicing or cubing of bacon, a problem which is constantly encountered is the fact that the cutting elements do not cut the bacon cleanly. This is because of the usually rather soft consistency of the bacon which causes the same, as it comes into engagement with the cutting edges of the cutting element or elements to become deformed so that a clean, straight cut is frequently entirely impossible. There are, of course, other foodstuffs which behave similarly, but for the sake of convenience, the material to be cut will hereafter be referred to as "bacon" and this is intended to encompass other foodstuffs, and in fact any other cuttable materials which present the same problems during cutting thereof.

A cutting or dicing apparatus for materials of the type here in question is disclosed in my above-mentioned copending application. As indicated there, this apparatus includes at least one first blade against which material to be cut is fed in a given direction of advancement. At least one elongated second blade is arranged adjacent the first blade downstream thereof, and is inclined with reference to the first blade. Guide means is provided for guiding the material to be cut in the given direction and in a predetermined path against the cutting edges of the two blades, whereby the material is cut by these edges. The blades, it will be appreciated, are reciprocated transversely of the direction of advancement of the material to be cut, so as to effect better cutting. This construction is a significant improvement over the present state of the art in apparatus of the type and for the purposes herein under discussion. However, it still has not been able to overcome the tendency of the bacon to become deformed as a result of contact with the cutting edges of the blades, even if such edges are very sharp, so that the bacon is then not severed along a clean and straight line.

It is therefore highly desirable to eliminate this shortcoming.

Summary of the invention

The present invention overcomes the shortcoming discussed above.

More particularly, the present invention provides a very clean and straight cut through bacon and food stuffs or other materials of the type discussed in the introductory comments to this specification.

Still more particularly, the present invention provides a cutting device which is highly reliable in its operation and which is rather inexpensive to manufacture and therefore to sell.

The device in accordance with the present invention can be operated by unskilled persons and no complicated or extensive training of the operator is involved.

In accordance with one feature of my invention, I provide a cutting device, particularly a cutting device suited for bacon and other foodstuffs. This device comprises advancing means provided for advancing the material to be cut in a predetermined path. At least one cutting element is arranged downstream of the advancing means and is mounted for displacement transversely of the predetermined path. Drive means is operatively connected with the advancing means and with the cutting element. The advancing means is actuated by the drive means for effecting intermittent operation of such advancing means and for thereby advancing the material in the predetermined path through a predetermined distance. Concomitantly, the drive means effects displacement of the cutting element transversely of the path of movement of the material through a distance which is greater than the predetermined distance which the material moves during intermittent operation of the advancing means.

Thus, during each stroke of the cutting element, the latter moves so fast, as compared with the rate of advancement of the material to be cut, namely the bacon, in its predetermined path, that there is little or no chance for the bacon to become deformed by engagement with the cutting edge of the cutting element. Rather, the cutting edge is now able to cleanly sever the bacon without deforming it, and a straight and clean cut is thus obtained.

It is advantageous that each stroke of the cutting element have a length of no less than 2.5 inches. In fact, in accordance with the invention it is desirable that the distance through which the advancing means advances the bacon in the predetermined path be adjustable between a minimum and a maximum given distance, and that the stroke of the cutting element be at least 2.6 times greater than the maximum given distance which can be adjusted. It is also a part of the concept of the present invention that during each intermittent advance of the bacon the cutting element perform two strokes in the direction transversely of the path of advancement with each of these strokes having the above-specified length. Thus, if the length of each stroke is 2.5 inches, the two strokes which consist each of a working movement across the path and a return movement again across the path, together result in a movement of the cutting element of no less than 10 inches. This distance, or rather the speed of movement resulting from the travel of the cutting element through such distance, assures a completely clean and straight cut of the bacon.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

The single figure is a somewhat diagrammatic illustration of one embodiment of the device according to the present invention.

Description of the preferred embodiment

The device shown by way of example in the single figure will, ordinarily, have a housing and a support. For the sake of clarity, these have both been omitted in the illustration as being non-essential to an understanding of the invention.

The device will be seen to comprise a shaft 2 which is suitably supported for rotational movement in the direction of the curved arrow in the non-illustrated housing. The shaft 2 is driven in the direction of the curved arrow in suitable manner, for instance by means of an electric motor, and this is not illustrated because such drive means are well known to those skilled in the art.

A worm gear 4 is fixed with the shaft 2 and engages with a drum wheel 6 which in turn is fixed on a rotary shaft 8 whose support in the housing is also not illustrated. A crank 10 is carried by the shaft 8, in the illustrated embodiment by the lower end thereof, and the free portion of the crank 10 is pivotally connected with a rod 12. In turn, the other end of the rod 12 is pivotally connected with a ratchet member 14 which is arranged for pivotal movement about a shaft 16 about which also the member 12 can turn.

The opposite ends of the shaft 16 are fixed with two connecting members 18 which are turnably mounted on a shaft 20 carrying a ratchet wheel 22 which is fixed thereon. It will be clear that rotation of the shaft 2 produces back-and-forth movement of the member 10 as a result of motion transmission from the worm wheel 4 to the worm wheel 6. Such movement of the member 10 results in similar back-and-forth movement of the member 12 and, because the member 14 intermittently engages into the recesses provided in the edge face of the wheel 22, the latter is intermittently rotated.

The upper end of shaft 20 carries in the illustrated embodiment a chain wheel 24 which evidently is rotated in the same sense as the ratchet wheel 22 because it is rigid with the shaft 20. A chain or suitable other connecting element engages the wheel 24 and is identified with reference numeral 28. It further engages a second chain wheel 26 which is mounted, in a manner which need not be further described because it will be obvious, for free rotation about the illustrated shaft. Fixed to the chain or other member 28 is a follower member 32 which in turn fixedly carries a longitudinally extending rod 30 whose forward end portion has secured thereto a plate-like pusher member 34. The pusher member 34 is guided for advancement in a channel or passage 36 which may be variously constituted and is illustrated only in phantom lines, being identified with reference numeral 36, because its construction is obvious to those skilled in the art. Clearly, as the chain wheel 24 intermittently turns, the chain 28 intermittently travels, and with it travels the follower member 32 and the rod 30 carrying the pusher member 34. Lest there be any doubt as to the operation of the device thusfar, it should be pointed out that the length of one run of the chain 28, namely that run which carries the follower member 32, is so selected intermediate the chain wheels 24 and 26, that the pusher member 34 can advance for the entire length of the guide channel 36 without the follower member 32 moving onto the other run of the chain. Of course, it is necessary, when the pusher member 34 has advanced to its maximum forward position, to reverse the device and to retract the pusher member 34 to its rearmost position.

The pusher member 34 advances, as will be evident from what has been said heretofore, in a stepwise manner because it is actuated only intermittently. The length of each step in its path of advancement is indicated with reference designation V and it will be evident that material, such as bacon, which is located forwardly of the pusher member 34, that is on that side thereof which is opposite its connection with the rod 30, will be advanced in the direction towards the right-hand side of the drawing.

As is clearly evident at this right-hand side of the drawing, the device also comprises a first cutting element 38 which consists of a plurality of cutting knives, and a second cutting element 40. The first cutting element 38 is reciprocable in vertical direction transversely of the advancement of the pusher member 34 and the material which is to be cut, and is guided in a holder 42 mounted for vertical reciprocation on a stationary support 41. The second cutter member 40 also consists of a plurality of knives and is horizontally reciprocable in a holder 44 which is similarly carried by the stationary support 41. The drive of the cutter member 42 takes place via a conical wheel 46 which is rigidly secured on the shaft 8 and engages with another conical wheel 48 rigidly secured on a shaft 50 which is, in a manner not illustrated, mounted in the housing. The free end of shaft 50 carries a crank 52 which transmits motion to the holder 42 for the cutter element 38 via the crank 54 and the fixed shaft 56. The cutter element 40, or rather its holder 44, is driven in similar manner via the schematically illustrated gears 58, 60 and 62, as well as via the crank 64 and the crank 66 which latter, as clearly illustrated, is connected to the holder 44.

It is evident that material which has passed in the predetermined path beyond the cutting elements 38 and 40, will have been cut into rods or strips. To subsequently dice the material, there is provided the additional knife 70 which is eccentrically secured on the shaft 68 which, in turn, is rigid with the gear 60 so that, as the latter turns, the knife 70 moves transversely of the path of advancement of the material and cuts the longitudinal rods or strips into cubes.

In accordance with the invention, it is desirable that the advancing stroke of the pusher member 34 be variable between a minimum and a maximum length. To this end, various possibilities exist, one of which being illustrated in the drawing where it will be seen that the member 10 is provided with a plurality of openings, complementing similar openings provided in the member 12 so that the combined length of the members 10 and 12 can be varied by inserting a suitable pin or other connecting member through any two selected openings on the members 10 and 12, respectively, thereby varying the combined length of these two members in dependence on the amount of overlapping which is permitted to exist. This, of course, is a well-known expedient and need not be further described.

In accordance with the invention the transmission ratios of the various gears and the length of the various cranks is so selected that the desired stroke lengths are obtained. Thus, the cranks 52 and 64 are to have a length of no less than 1.25 inches which will result in the stroke H of at least 2.5 inches for the cutter member 42. The ratios should also be such, in accordance with the invention, that during each advancing stroke of the pusher member 34 the cutter elements 42 and 44 perform two strokes, each consisting of a forward and a reverse movement transversely of the path of advancement of the material to be cut. Of course, the desired relationship of the length of the stroke of the cutting elements 42, 44 versus the advancing stroke of the pusher member 34 results in greater speed of movement of the knives of the members 38 and 40, and thus provides the desired clean cut in the bacon.

It will be understood that each of the elements described above, or two or more together, may also find a useful application in other types of cutting devices differing from the types described above.

While the invention has been illustrated and described as embodied in the cutting device which is particularly suitable for bacon and other foodstuffs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A cutting device, particularly for bacon and other foodstuffs, comprising, in combination, advancing means for advancing material to be cut in a predetermined path; a first cutting element arranged downstream of said advancing means and having first cutting edge portions elongated in a first direction transversely to said path, and a second cutting element adjacent said first cutting element and having second cutting edge portions elongated in a second direction also transversely to said path and inclined to said first direction; and drive means connected with said advancing means and operative for effecting intermittent operation thereof for advancing the material in said path through a predetermined distance during each operation of said advancing means, and for concomitantly effecting displacement of said first and second cutting elements in said first and second directions, respectively, and each through a distance greater than said predetermined distance.

2. A cutting device as defined in claim 1, wherein said drive means is operative for effecting displacement of each of said cutting elements through a distance which constitutes a multiple of said predetermined distance.

3. A cutting device as defined in claim 1, wherein said drive means is operative for effecting displacement of each of said cutting elements through a distance which exceeds said predetermined distance by a ratio of 1:2.6.

4. A cutting device as defined in claim 1, wherein said cutting device comprises a pusher member mounted for movement in said predetermined path, said drive means being operative for intermittently advancing said pusher member through successive increments, and for effecting displacement of each of said cutting elements at least twice during each such increment and through respective distances which are greater than said predetermined distance.

5. A cutting device as defined in claim 1, said drive means comprising adjusting means for adjusting said predetermined distance between a minimum and a maximum predetermined distance, and wherein said drive means is operative for effecting displacement of each of said cutting elements through a given distance at least equal to 2.6 times said maximum predetermined distance.

6. A cutting device as defined in claim 5, and further comprising an additional cutting element arranged downstream adjacent said first and second cutting elements and also mounted for displacement transversely of said path, said drive means being operatively connected to said additional cutting element for effecting displacement thereof.

7. A cutting device as defined in claim 5, wherein said given distance is at least 2.5 inches.

References Cited

UNITED STATES PATENTS

| | | |
|---|---|---|
| 67,254 | 7/1867 | Bliesner. |
| 1,430,049 | 9/1922 | Applegate. |
| 2,157,604 | 5/1939 | Gray. |

W. GRAYDON ABERCROMBIE, Primary Examiner